US012005011B2

(12) United States Patent
Hayes

(10) Patent No.: US 12,005,011 B2
(45) Date of Patent: Jun. 11, 2024

(54) ADAPTABLE ATTACHMENT FOOT PLATE FOR A WHEELCHAIR

(71) Applicant: Dave Hayes, Omaha, NE (US)

(72) Inventor: Dave Hayes, Omaha, NE (US)

(*) Notice: Subject to any disclaimer, the term of this patent is extended or adjusted under 35 U.S.C. 154(b) by 430 days.

(21) Appl. No.: 17/191,322

(22) Filed: Mar. 3, 2021

(65) Prior Publication Data

US 2022/0280364 A1 Sep. 8, 2022

(51) Int. Cl.
*A61G 5/12* (2006.01)
*A61G 5/10* (2006.01)

(52) U.S. Cl.
CPC ............ *A61G 5/128* (2016.11); *A61G 5/1094* (2016.11)

(58) Field of Classification Search
CPC .............................. A61G 5/128; A61G 5/1094
See application file for complete search history.

(56) References Cited

U.S. PATENT DOCUMENTS 4,120,530 A * 10/1978 Imbro ...................... A61G 5/14 297/DIG. 10
7,694,991 B2 * 4/2010 Mills ........................ A61G 5/10 180/11
8,152,192 B2 * 4/2012 Dougherty ........... A61G 5/1089 280/767
8,388,010 B2 * 3/2013 Butts ...................... A61G 5/047 280/250.1
9,168,191 B1 * 10/2015 Langley ................... A61G 5/12
2017/0127842 A1 * 5/2017 Sayed .................... A61G 5/128

OTHER PUBLICATIONS

FreeWheel, FreeWheel Website, Mar. 2, 2021 (https://www.gofreewheel.com/, accessed Jan. 12, 2024).

* cited by examiner

*Primary Examiner* — Jacob D Knutson

(57) ABSTRACT

An adaptable attachment foot plate for a wheelchair that protects a user's feet and legs while providing interchangeable attachment of at least one functional attachment is described. The adaptable attachment foot plate replaces the conventional foot plate and is retrofitted to a wheelchair. The adaptable attachment foot plate is durable and resistant to damage from torque when additional pressure is applied to the adaptable attachment foot plate. The adaptable attachment foot plate includes a base and a guard. The base provides a means for attachment to the wheelchair and the guard provides a means for protection of the user's feet and legs and a means for attaching interchangeable functional attachments without the use of additional brackets to attach the functional attachments.

8 Claims, 10 Drawing Sheets

ADAPTABLE ATTACHMENT FOOT PLATE FOR A WHEELCHAIR

BACKGROUND

Wheelchair foot plates accommodate the feet of a wheelchair user, where the user rests their feet upon the foot plate. By resting their feet upon a foot plate the user's feet do not contact the ground or the front casters of the wheelchair, which protects the user's feet and legs from contact with the ground and the front caster wheels and allows for unimpeded movement of the wheelchair. Conventional foot plates are often a single bar or flat rectangular plate, a flat plate with a rounded front edge, or two separate foot plates where each foot plate accommodates one of the user's feet. These conventional foot plates lack the ability to prevent a user's feet from slipping off the foot plate when navigating bumpy terrain or during extended use, such that a user's feet and legs may be susceptible to injury and movement of the wheelchair may be impeded. Further, these conventional foot plates often lack the ability to provide a mechanism for securing interchangeable functional attachments (e.g. a terrain wheel that allows the wheelchair to navigate uneven terrain, a light attachment for increased visibility, a wood table, a gun stand, or a fishing rod holder).

A conventional foot plate that is a single bar or flat rectangular plate lacks the ability to protect a user's feet and legs as there is no comparable structure to prevent a user's feet from slipping off of the foot plate. Further, this foot plate design does not provide a structural mechanism for securing interchangeable functional attachments. Finally, conventional foot plates of this design often succumb to torque leading to damage because of less durable materials and design.

Other conventional foot plates consisting of a flat plate with a rounded front edge provide protection for a user's feet as the rounded front edge assists in preventing the user's feet from slipping off of the foot plate. However, this foot plate design does not provide a mechanism for securing interchangeable functional attachments.

Further, conventional functional attachments, such as the FreeWheel® design provide for the attachment of a single functional attachment of a terrain wheel to a conventional foot plate, however as noted these conventional foot plate designs do not provide a structural mechanism for interchangeable functional attachments. Additionally, the conventional designs of these functional attachments do not allow for storage of the terrain wheel underneath the wheelchair in a position that allows for quick movement to a use position providing members of the adaptive community and those that assist them increased convenience and self-sufficiency in a variety of activities. Further, this design lacks the ability to protect a user's feet and legs as there is no structure to prevent a user's feet from slipping off of the foot plate during use.

It is therefore desirable to provide a foot plate that protects a user's feet and legs, while allowing unimpeded movement of the wheelchair by providing a structure that prevents a user's legs from slipping off of the front of the foot plate. It is further desirable to provide a foot plate that allows for interchangeable functional attachments without requiring additional brackets to attach the functional attachment. Additionally, it is desirable that the foot plate allow for attachment of two or more functional attachments at the same time. Finally, it is further desirable that the foot plate be less susceptible to torque providing durability to the foot plate.

SUMMARY

In aspects, an adaptable attachment foot plate for removable attachment to a wheelchair, the adaptable attachment foot plate includes a base, where the base is removably attached to a rigid frame of the wheelchair, the base including a plate, two bracket attachments, where each bracket attachment extends outward and upward from the plate, wherein the bracket attachments are removably attached to the rigid frame of the wheelchair; and screw hole attachment points, the screw hole attachment points residing in the plate, wherein the screw hole attachment points provide removable attachment to a single bar foot plate of the rigid frame of the wheelchair; and a guard, where the guard is attached to the plate opposite from the screw hole attachment points, the guard including a toe guard, where the toe guard is a rectangular shape having a top, a bottom, a front, a left side, and a right side; wherein a fastener opening is formed from the top of the toe guard, where the fastener opening receives a fastener; a mounting bracket, the mounting bracket extending in front of the toe guard, where the mounting bracket forms two grooved slots configured to receive a functional attachment; and a fastener, the fastener removably attached to the fastener opening and configured to lock the functional attachment to the guard.

In other aspects, an adaptable attachment foot plate for removable attachment to a wheelchair for allowing movement of a wheelchair over uneven terrain, the adaptable attachment foot plate and terrain wheel functional attachment includes a base, the base including a plate, and a means for removably attaching the adaptable attachment foot plate to a rigid frame of the wheelchair; and a guard, where the guard is attached to the plate, the guard including a means for protecting a user's feet and legs, and a means for attaching at least one interchangeable functional attachment.

In other aspects, an adaptable attachment foot plate and terrain wheel functional attachment, the adaptable attachment foot plate including a base, the base including a plate, and a means for removably attaching the adaptable attachment foot plate to a rigid frame of the wheelchair; and a guard, where the guard is attached to the plate, the guard including a means for protecting a user's feet and legs, and a means for attaching a terrain wheel functional attachment; and a terrain wheel functional attachment, the terrain wheel functional attachment including a mounting slide and a top, the mounting slide and top being attached at an approximately 90 degree angle, where the mounting slide and top are configured to be received by the removably attaching means; a functional attachment fastener opening, the functional attachment fastener opening formed from the top of the mounting slide, where the functional attachment fastener is configured to provide locking of the terrain wheel functional attachment to the adaptable attachment foot plate via the removably attaching means; and a functional portion, the functional portion including a joint, where the joint is attached to the mounting slide and provides rotational movement for a support; the support, where the support is in rotational attachment to the joint; a storage caster wheel, the storage caster wheel attached to the support, where the storage caster wheel contacts the ground when the functional attachment is in a storage position; and a terrain wheel.

FIGURES

FIG. 1 represents a perspective view of an adaptable attachment foot plate for a wheelchair.

FIG. 2*a* represents a top down view of the adaptable attachment foot plate.

FIG. 2*b* represents a side view of the adaptable attachment foot plate.

DETAILED DESCRIPTION

An adaptable attachment foot plate for a wheelchair that protects a user's feet and legs while providing interchangeable attachment of at least one functional attachment is described. The adaptable attachment foot plate replaces the conventional foot plate and is retrofitted to a wheelchair. The adaptable attachment foot plate is durable and resistant to damage from torque when additional pressure is applied to the adaptable attachment foot plate. The adaptable attachment foot plate includes a base and a guard. The base provides a means for attachment to the wheelchair and the guard provides a means for protection of the user's feet and legs and a means for attaching interchangeable functional attachments without the use of additional brackets to attach the functional attachments.

Figure 1:
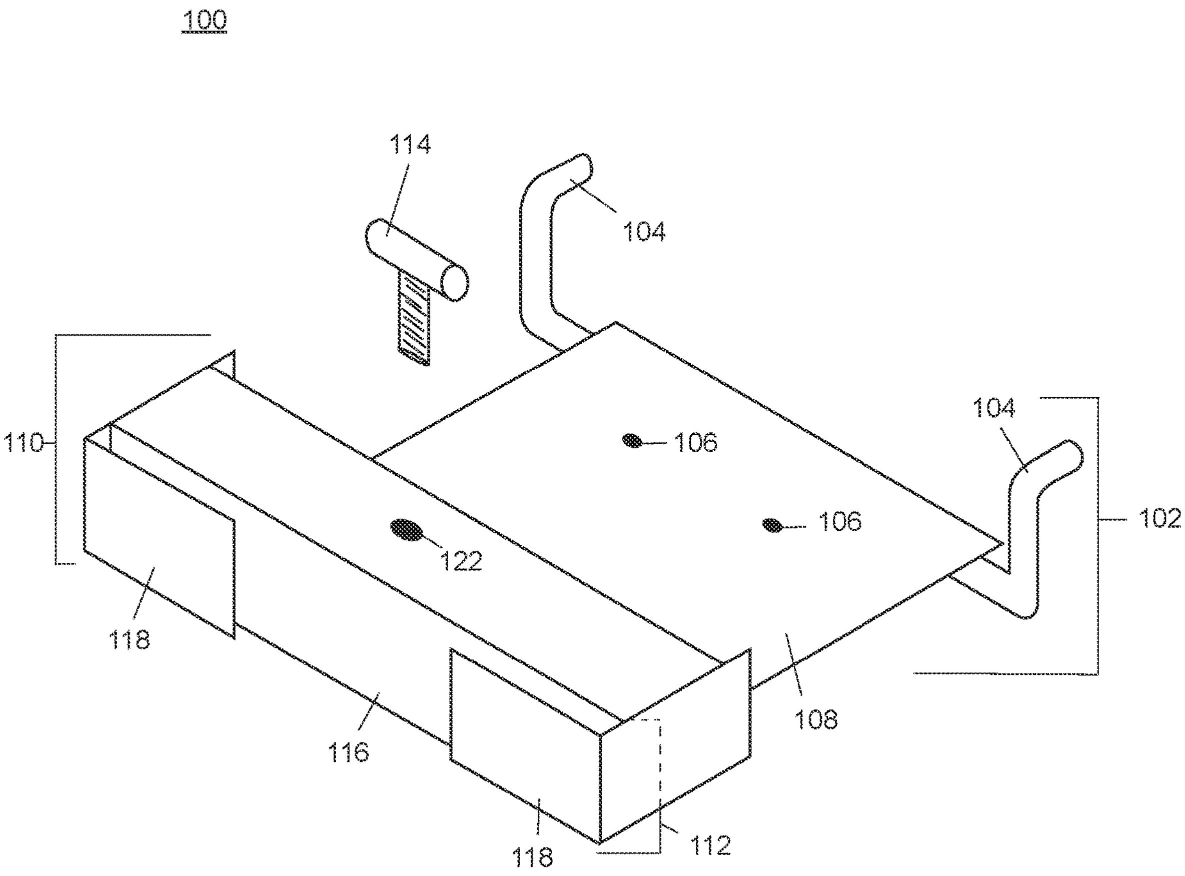

FIG. 1 represents a perspective view of an adaptable attachment foot plate 100. The adaptable attachment foot plate 100 includes a base 102 and a guard 110. The base 102 provides a means for attachment of the adaptable attachment foot plate 100 to a wheelchair. The base 102 includes a plate 108, bracket attachments 104, and screw hole attachment points 106. The plate 108 is a shape that allows a user's feet to rest upon the plate 108, such as square, rectangle, or the like. The plate 108 has a width that fits between the rigid frame of the wheelchair, such as from 15.24 to 30.48 centimeters (6 to 14 inches). The plate 108 has a length that accommodates the user's feet, such as from 10.16 to 30.48 centimeters (4 to 12 inches). The plate 108 is made from a non-corrosive, durable material, such as steel, stainless steel, iron alloys, aluminum, titanium, composite plastic, combinations thereof, and the like.

The bracket attachments 104 and screw hole attachment points 106 of the base 102 provide the means for attachment of the adaptable attachment foot plate 100 to the wheelchair. The bracket attachments 104 provide attachment of the adaptable foot plate 100 to a rigid frame of the wheelchair (see FIG. 3 for complete view of the bracket attachments 104, including the bracket 124), preferably through two bracket attachments 104. The bracket attachments 104 extend outward and upward from the plate 108. The brackets are of a height to reach from the plate 108 to the rigid frame, such as from 5.08 to 25.4 centimeters (2 to 10 inches) (see FIG. 2*a* for legend orientation of the height, width, and length measurements). The bracket attachments 104 are preferably removably attached to the rigid frame, such as through bolts, screws, or the like. The bracket attachments 104 each include a bracket 124 configured for receiving a portion of the rigid frame of the wheelchair to provide attachment to the rigid frame. For example, a bottom portion of the bracket 124 includes a bottom half circle to receive the portion of the wheelchair frame and a top portion of the bracket 124 includes a top half circle to surround the portion of the wheelchair frame, where the top and bottom portions of the brackets 124 are secured together via screws (see FIGS. 4-6 for additional views of this attachment). The bracket attachments 104 may be permanently attached to the frame, such as through welding or the like.

The screw hole attachment points 106 provide another attachment point to the rigid wheelchair frame. Preferably, the screw hole attachment points 106 provide removable attachment of the adaptable attachment foot plate 100 at conventional foot plate attachment points, such as through screws, bolts, or the like.

The guard 110 of the adaptable attachment foot plate 100 is a means for protecting a user's feet and legs and providing interchangeability of functional attachments. Additionally, the guard 110 may further be a means for providing attachment of at least one functional attachment 500. The guard 110 includes a toe guard 116, a mounting bracket 112 (see also FIG. 2*a*), and a fastener 114. The guard 110 is positioned opposite to the bracket attachments 104 at a front of the adaptable attachment foot plate 100. The guard 110 is a length from 2.54 to 15.24 centimeters (1 to 6 inches), and the guard 110 is a width from 15.24 to 45.72 centimeters (6 to 18 inches). The guard 110 is made from a durable, non-corrosive material such as steel, stainless steel, metal alloys, aluminum, titanium, composite plastic, combinations thereof, and the like.

The guard 110 may be formed from the plate 108 of the base 102. Further, the guard 110 may be removably attached to the plate 108, such as through welding, bolts, screws or the like. For example, the guard 110 may be removably attached by a bottom side of the toe guard 116, where the plate 108 includes a groove on the bottom side that receives the bottom side of the toe guard 116 and is removably secured via one or more screws. Further the groove on the bottom side of the plate 108 may be include two grooved slots on opposite sides on the bottom of the plate 108 that receive the bottom side of the toe guard 116.

The toe guard 116 protects a user's feet and legs. The toe guard 116 is rectangular shaped having five sides (a top, a front, a bottom, and a right and left side) to prevent a user's feet from leaving the adaptable attachment foot plate 100 from the front, the left and right sides, the top, and the bottom. The user's feet are received at an opening of the toe guard 116 and reside within the toe guard 116 during use. The toe guard 116 is of a height to accommodate the user's feet such as from 3.81 to 12.7 centimeters (1.5 to 5 inches). By preventing a user's feet from leaving the adaptable attachment foot plate 100 a user's feet and legs are protected from coming into contact with the ground or front caster wheels, and the movement of the wheelchair is unimpeded. The top of the toe guard 116 further includes a fastener opening 122 that receives the fastener 114. The fastener opening 122 is of a size and shape to receive the fastener 114. The toe guard 116 may include an adjustable height to accommodate shoes of the user that have different heights.

The mounting bracket 112 provides interchangeability of functional attachments 500. The mounting bracket 112 having two grooved slots (see also FIG. 2*a*) extends outward in front of the toe guard 116, where the two grooved slots 118 create an attachment opening 120 between the two grooved slots 118. The grooved slots 118 receive a corresponding mounting slide 518 of the functional attachment 500, and a top 516 of the functional attachment 500 resides in contact with the top of the toe guard 116 (see FIG. 3). Each grooved slot 118 may be a height from 2.54 to 12.7 centimeters (1 to 5 inches). Each grooved slot 118 may be a width from 5.08 to 12.065 centimeters (2 to 4.75 inches). The attachment opening 120 permits accommodation of functional attachments 500 that extend forward from the adaptable attachment foot plate 100, such as when the functional portion 502 is a terrain wheel. The attachment opening 120 may be from 5.08 to 21.59 centimeters (2 to 8.5 inches) in width.

The fastener 114 may further allow for interchangeability of the functional attachment 500. The fastener 114 is received by the fastener opening 122 of the toe guard 116 and a functional attachment fastener opening 522 to lock the functional attachment 500 to the guard 110 of the adaptable attachment foot plate 100. The fastener 114 may include a threaded screw, a bolt, a ball lock pin, a pin and clip, or the like.

Figure 2B:
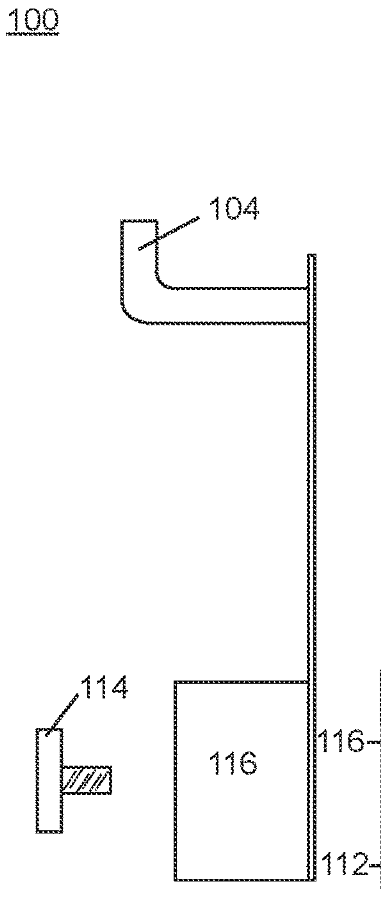
Figure 2A:
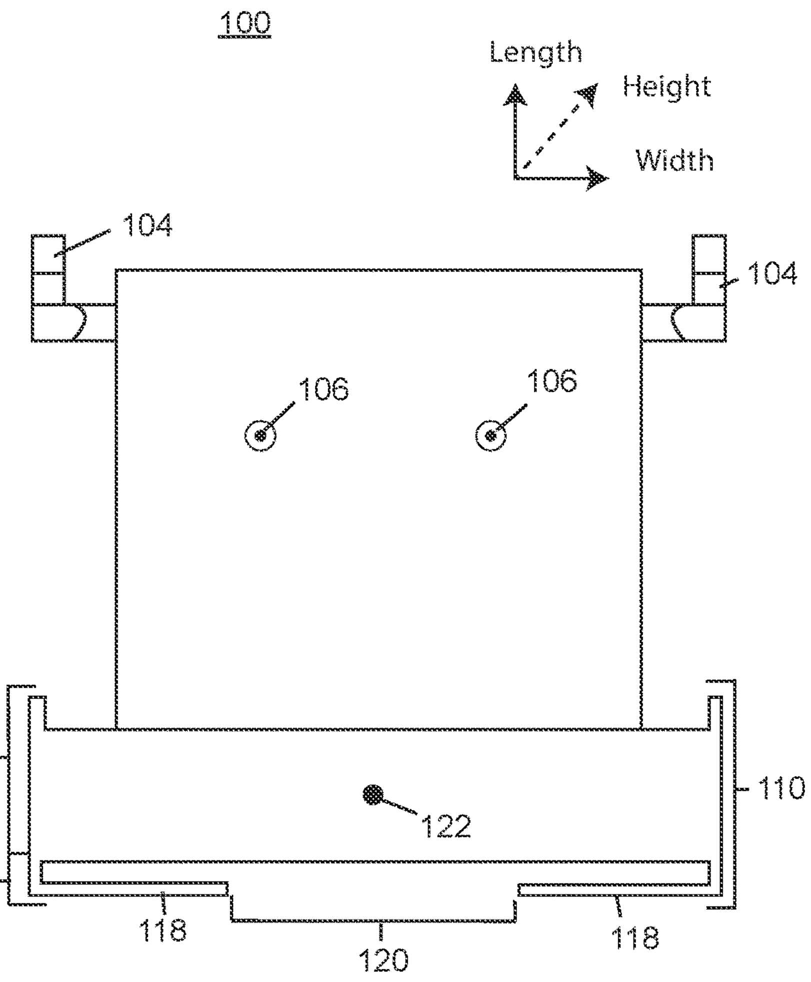

FIG. 2*a* represents a top view of the adaptable attachment foot plate 100. This top view shows the mounting bracket 112, including the groove slots 118 that form the attachment opening 120. Further, this top view demonstrates that the sides of the toe guard 116 may extend past the opening of the toe guard toward to the bracket attachments 104 providing additional protection from a user's feet leaving the adaptable attachment foot plate 100 to the left and right sides.

FIG. 2*b* represents a side view of the adaptable attachment foot plate 100. This side view shows one of the bracket attachments 104 extending upward and away from the base 102.

Figure 3:
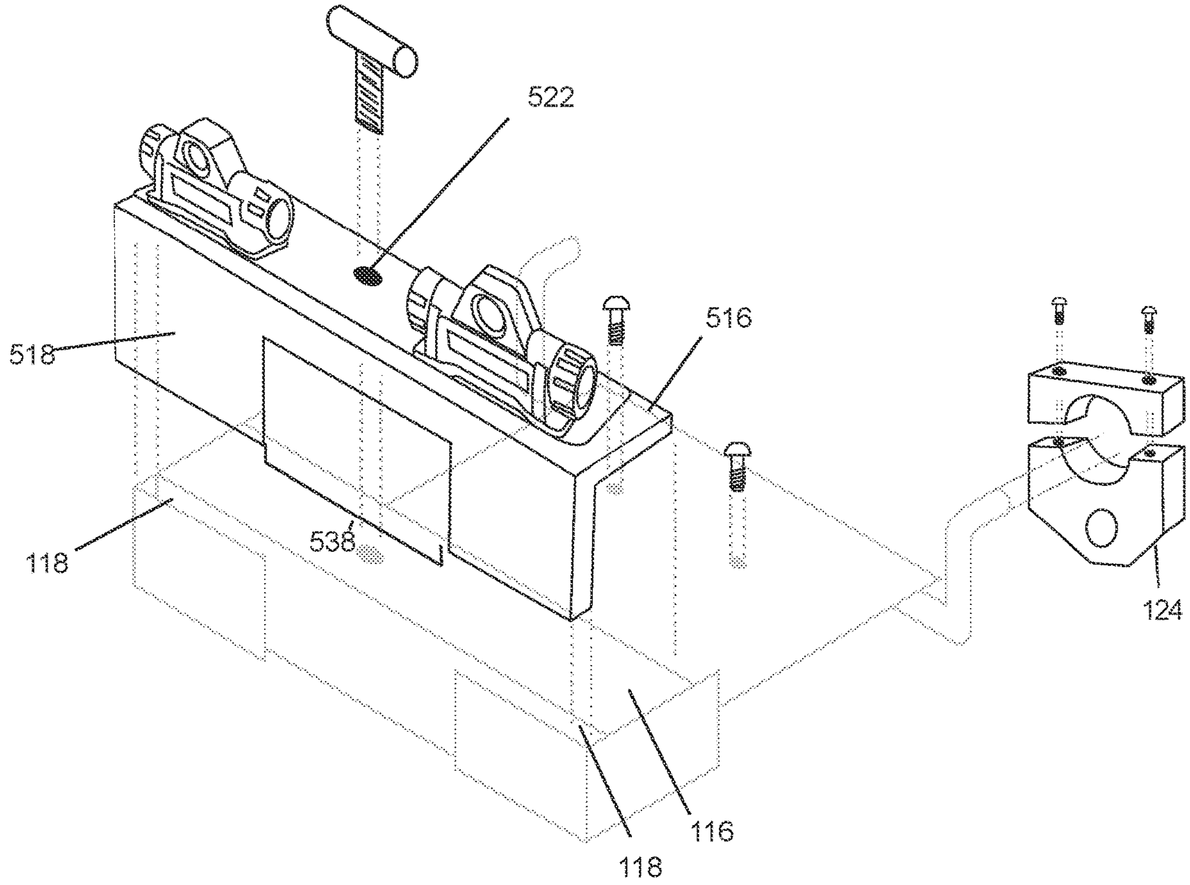
FIG. 3 represents an exploded view of the adaptable attachment foot plate having a functional attachment of a light attachment.

FIG. 3 represents an exploded perspective view of the adaptable attachment foot plate 100 and a functional attachment 500 for illustrative purposes of demonstrating how the functional attachment 500 is removably attached to the guard 110 and how the adaptable attachment foot plate 100 is attached to the wheelchair. In particular, the grooved slots 118 receive a corresponding mounting slide 518 of the functional attachment 500, and a top 516 of the functional attachment 500 resides in contact with the top of the toe guard 116.

A functional attachment 500 provides an added function to the wheelchair. The functional attachment 500 includes a mounting slide 518, a top 516, a functional attachment fastener opening 522, and a functional portion 520. The functional portion 520 provides the added function as discussed further in FIGS. 5-10. For example, the functional portion 520 may be a terrain wheel, a light attachment for increased visibility, a wood table, a gun stand, or a fishing rod holder.

The mounting slide 518 of the functional attachment 500 provides a corresponding slat to be received by the grooved slots 118 of the guard 110 (see FIG. 3). The mounting slide 518 is made from a non-corrosive, durable material, such as steel, stainless steel, iron alloys, aluminum, titanium, composite plastic, combinations thereof, and the like. The mounting slide 518 is attached to the top 516, such as through welding, soldering, or the mounting slide 518 and the top 516 may be formed as a single piece. The top 516 is substantially the same size and shape as the top of the toe guard 116.

The top 516 of the functional attachment 500 provides a ledge for contacting the top of the toe guard 516 (see representation in FIG. 3), and includes the functional attachment fastener opening 522. The top 516 is made from a non-corrosive, durable material, such as steel, stainless steel, iron alloys, aluminum, titanium, composite plastic, combinations thereof, and the like.

The functional attachment fastener opening 522 allows locking of the functional attachment 500 to the guard 110. The functional attachment fastener opening 522 is of a size and shape to receive the fastener 114. When the top 516 is in contact with the top of the toe guard 116, and the mounting slide 518 is received by the grooved slots 118, the functional attachment fastener opening 522 is in alignment with the fastener opening 122, such that the fastener 114 is received by the functional attachment fastener opening 522 and the fastener opening 122 to lock the functional attachment 500 to the guard 110 of the adaptable attachment foot plate 100.

The functional portion 520 provides additional functionality to the wheelchair. For example, the functional portion 520 may be a terrain wheel, a light attachment for increased visibility, a wood table, a gun stand, or a fishing rod holder. The functional portion 520 may be attached to the mounting slide 518 or the top 516, such as through welding, soldering, bolting, or the like.

For example, when the functional portion 520 is the terrain wheel, gun stand, wooden table, or fishing rod holder, the functional portion 520 is attached to the mounting slide 518. When the functional portion 520 is attached to the mounting slide 518, the attachment opening accommodates the attachment of the functional attachment 520 allowing it to extend forward and outward from the guard 110 of the adaptable attachment foot plate 100 (see FIGS. 5-9). Or for example, when the functional portion 520 is the light attachment, the functional portion 520 is attached to the top 116.

Figure 4:
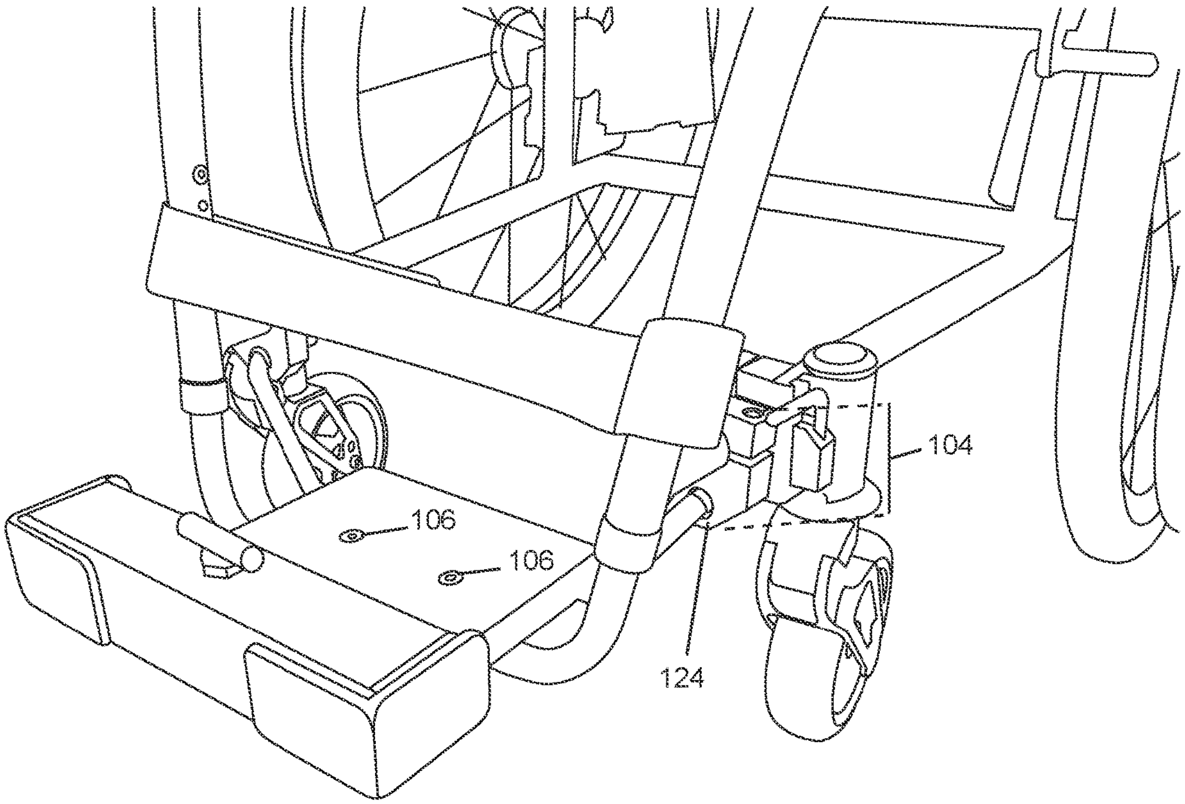
FIG. 4 represents a perspective view of an adaptable attachment foot plate attached to a wheelchair without a functional attachment attached.

FIG. 4 represents a perspective view of an adaptable attachment foot plate attached to a wheelchair, without a functional attachment attached. FIG. 4 demonstrates the attachment of the bracket attachments 104 to the rigid frame of the wheelchair via the brackets 124, and the attachment of the screw hole attachment points 106 to the rigid wheelchair frame.

Figure 5:
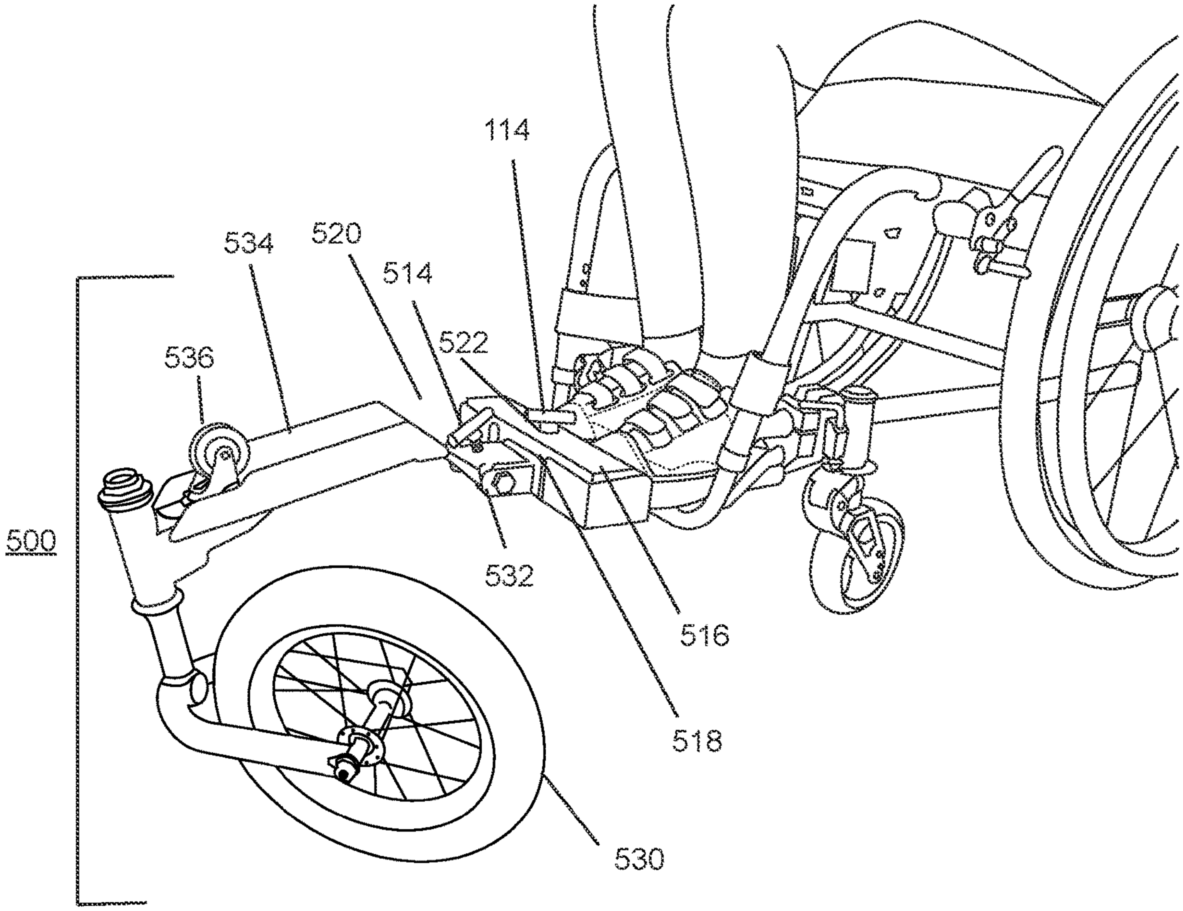
FIG. 5 represents a perspective view of the adaptable attachment foot plate having a terrain wheel functional attachment in a use position.

FIG. 5 represents a perspective view of the adaptable attachment foot plate 100 having a terrain wheel functional attachment in a use position. When the functional attachment 500 is a terrain wheel functional attachment, the functional portion 520 is a means for allowing movement of the wheelchair over uneven terrain via the ability of a terrain wheel 530 to spin in 360 degrees and storage of the functional attachment without removing the functional attachment 500 from the adaptable attachment foot plate 100. When the functional portion 520 is a terrain wheel, the functional portion 520 includes a terrain wheel 530, a joint 532, a support 534, and a storage caster wheel 536.

The joint 532 is attached to the mounting slide 518 and provides rotational movement of the support 534, such as through a clevis linkage, a bolted joint, or the like. Further, the joint 532 provides a locking mechanism 514 for locking the functional portion 520 in the use position or the storage position, such as through a threaded screw, a bolt, a ball lock pin, a pin and clip, or the like.

The support 534 is attached in rotational movement to the joint 532 extending outward from the mounting slide 518 and joint 532 to provide support to the wheelchair for moving in coordination with the terrain wheel functional portion 520. The support 534 may be of any non-corrosive durable material such as steel, stainless steel, iron alloys, aluminum, titanium, composite plastic, combinations thereof, and the like.

The caster wheel allows storage of the terrain wheel functional portion 520 underneath the wheelchair by contacting the ground to keep the terrain wheel functional portion 520 in place in storage while the wheelchair moves across the ground. The caster wheel 536 is attached to the support 534, such as through bolts, rivets, screws, or the like. The caster wheel 536 is attached on the top of the support 534 as viewed from the use position, such that the caster wheel 536 faces upward in the use position and contacts the ground in the storage position (see FIG. 7).

The terrain wheel 530 is attached in swivel movement to the support 534 and provides movement (e.g. enhances) of the wheelchair over uneven terrain. The terrain wheel provides additional traction and lifts the front caster wheels of the wheelchair off the ground to prevent the front caster wheels from impeding movement over uneven terrain.

Figure 6:
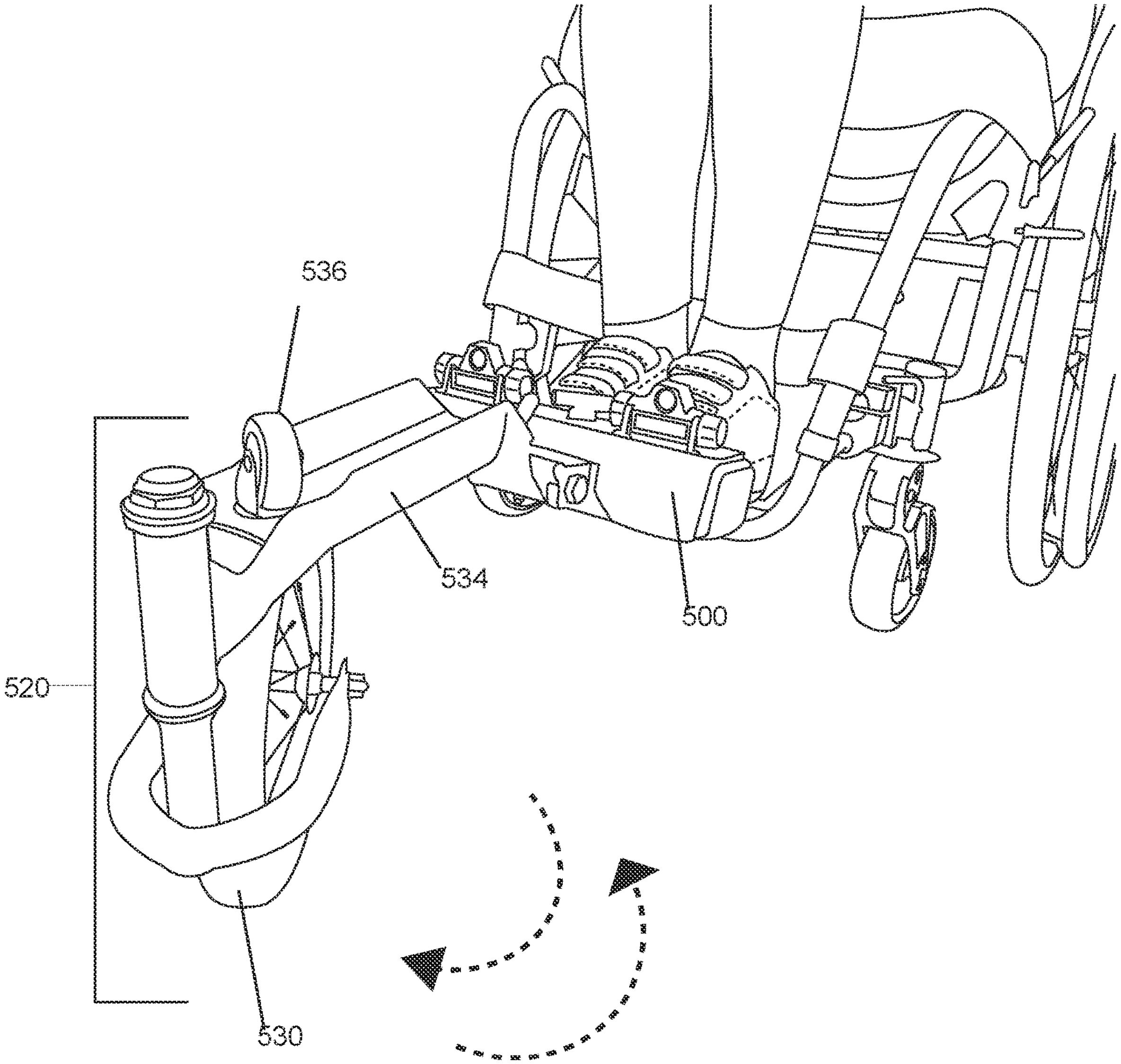
FIG. 6 represents a second perspective view of the adaptable attachment foot plate having the light functional attachment and terrain wheel functional attachment in a use position.

FIG. 6 represents a second perspective view of the adaptable attachment foot plate having a terrain wheel and a light attachment functional attachments 500 attached, where the terrain wheel functional portion 520 is in a use position. FIG. 6 shows the swivel attachment of the terrain wheel 530 to the support 534. FIG. 6 also shows the ability of the adaptable attachment foot plate 100 to accommodate two functional attachments 500 at once.

Figure 7:
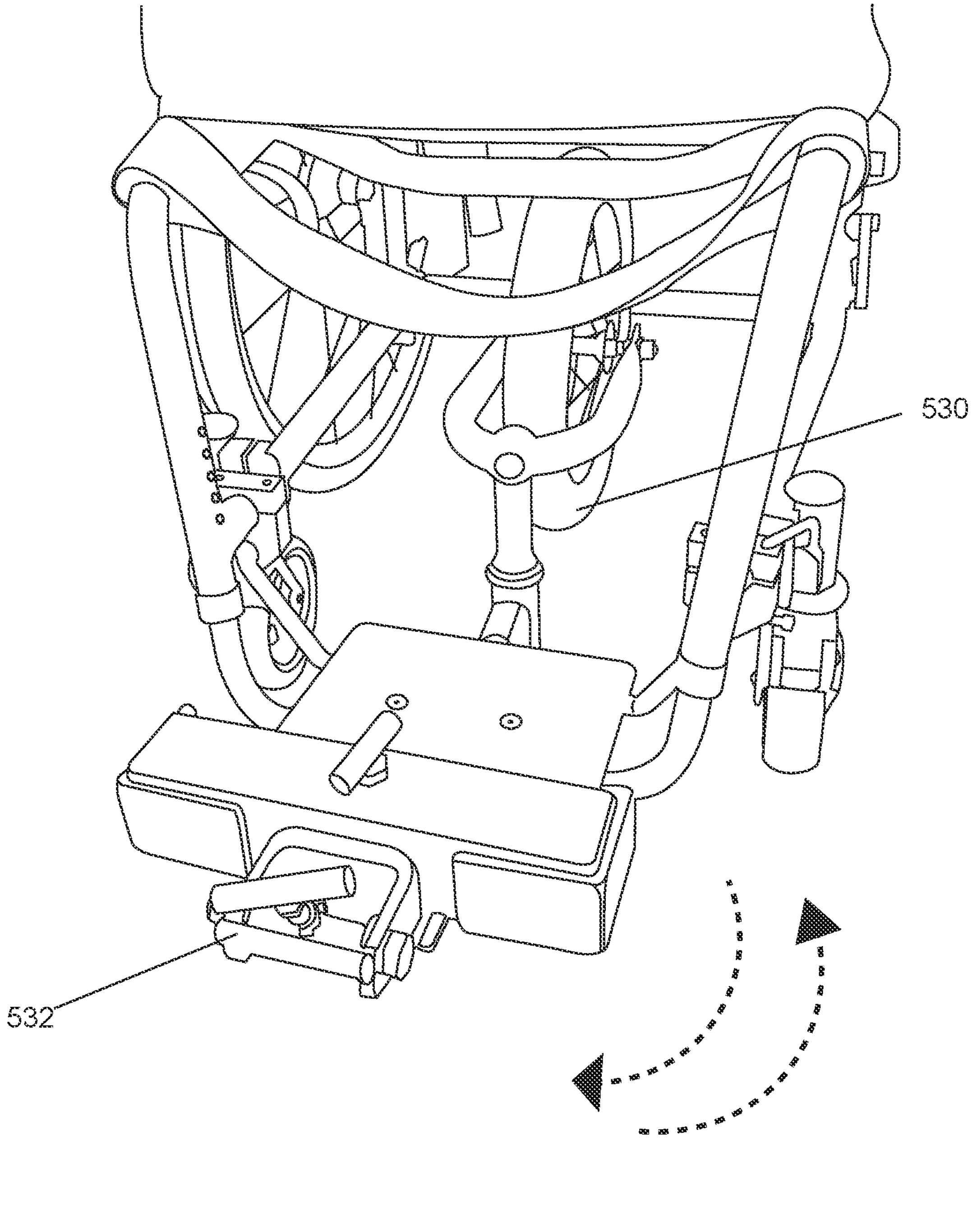
FIG. 7 represents a perspective view of the adaptable attachment foot plate having a terrain wheel functional attachment in the storage position.

FIG. 7 represents a perspective view of the adaptable attachment foot plate 100 having a terrain wheel functional attachment 520 in a storage position. In the storage position the terrain wheel functional portion 520 is underneath the wheelchair with the caster wheel 536 contacting the ground. For movement from the storage to the use position, joint 532 is moved to an unlocked position, and the wheelchair is tipped backwards lifting the front caster wheels off the ground. This allows rotational movement of the support 534 to rotate the support 534 and terrain wheel 530 from underneath the wheelchair to extend in front of the wheel chair, where the joint 532 is then moved to the lock position. For movement from the use to the storage position, the joint 532 is moved to an unlocked position, and wheelchair is tipped backwards lifting the front caster wheels off the ground. This allows rotational movement of the support 534 to rotate the support 534 and terrain wheel 530 from extended in front of the wheelchair to underneath the wheelchair, where the joint 532 is then moved to the lock position.

Figure 8:
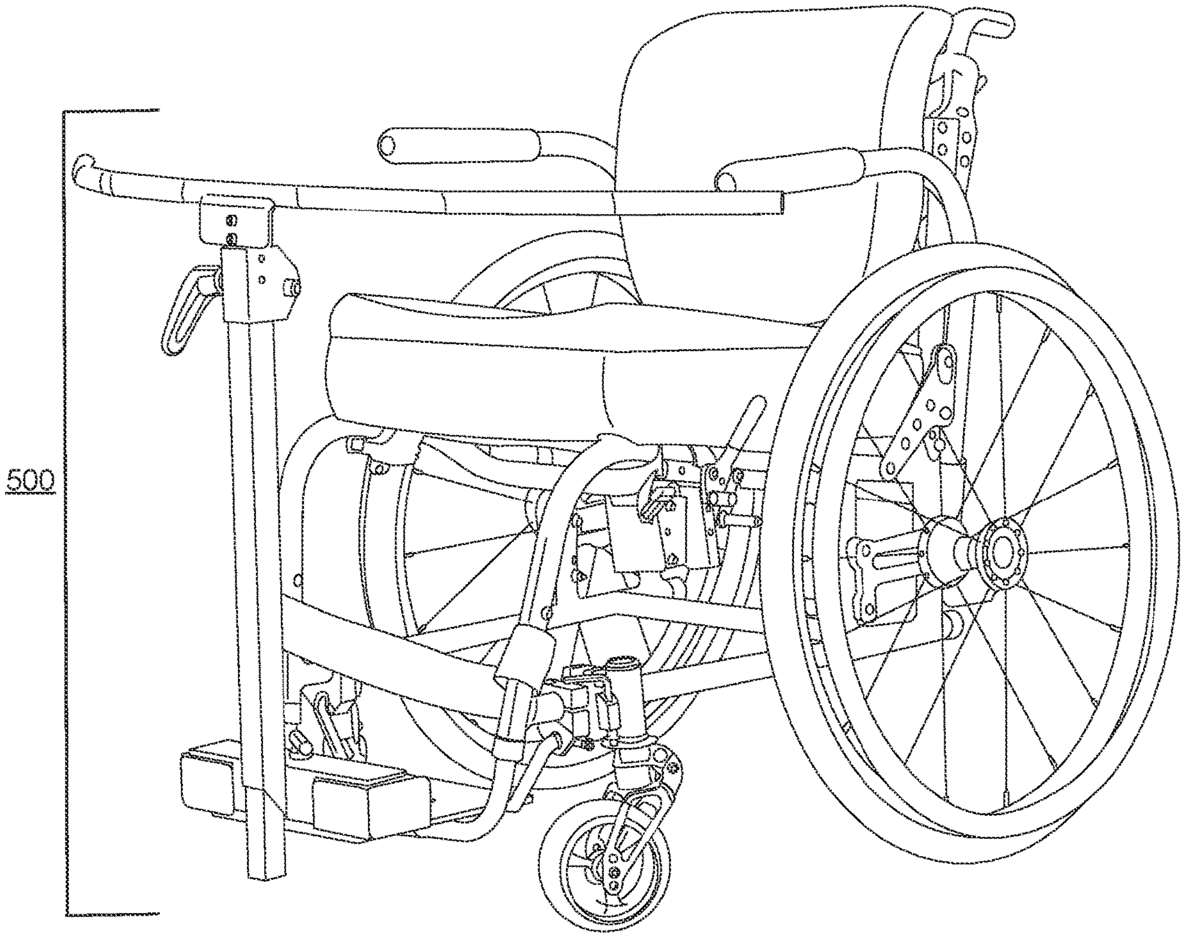
FIG. 8 represents a perspective view of the adaptable attachment foot plate having a gun stand functional attachment that is adjustable in height.

FIG. 8 represents a perspective view of the adaptable attachment foot plate having a gun stand functional attachment. The gun stand functional portion 520 is attached to the mounting slide 518. The gun stand functional portion 520 is adjustable through a quick release clamp on a sliding post, a pin-and-clip at differing height holes, an adjustable bolt, a locking rotating gear, or the like.

Figure 9:
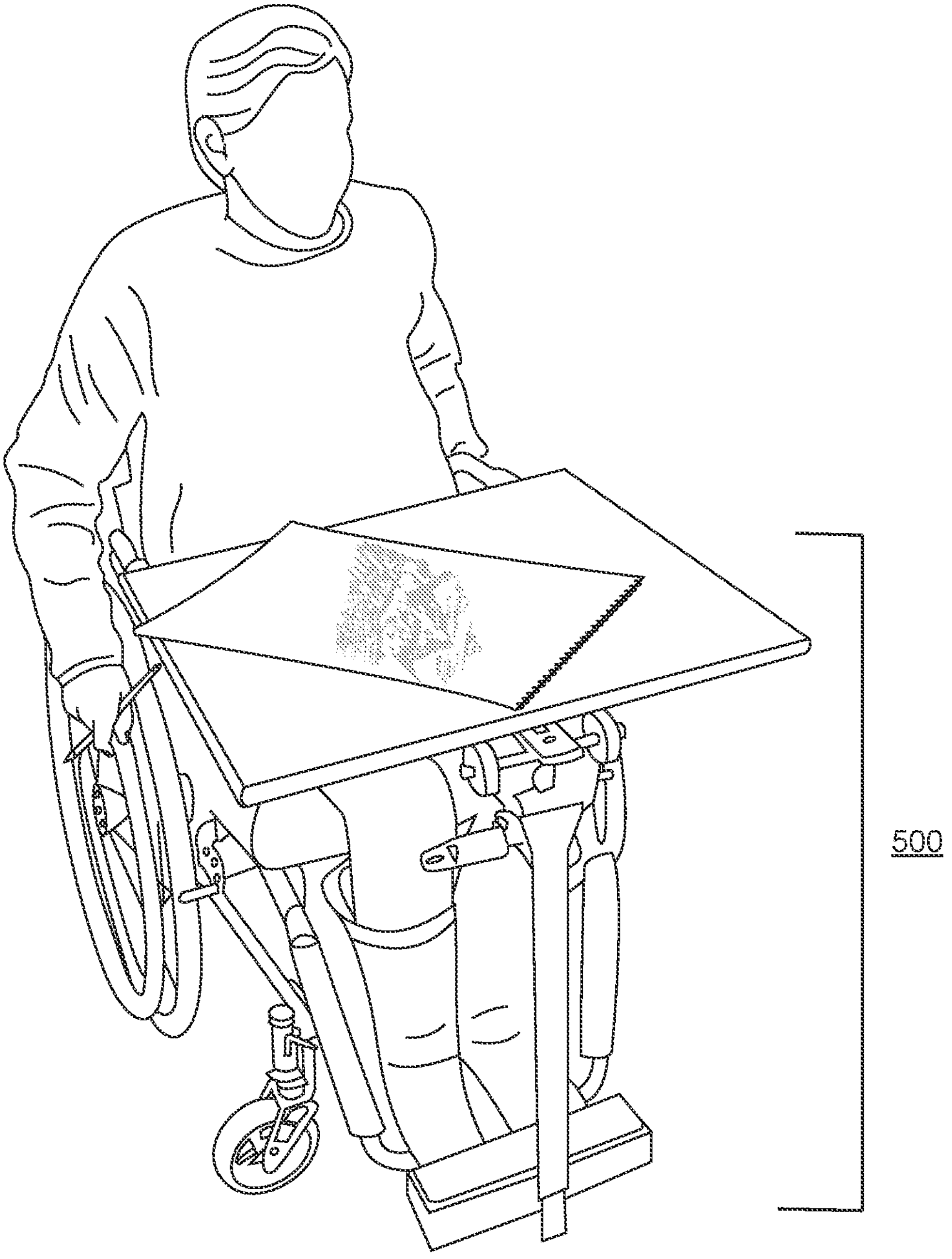
FIG. 9 represents a perspective view of the adaptable attachment foot plate having a wooden table functional attachment that is adjustable in height.

FIG. 9 represents a perspective view of the adaptable attachment foot plate having a wooden table functional attachment. The wooden table functional portion 520 is attached to the mounting slide 518. The wooden table functional portion 520 is adjustable through a quick release clamp on a sliding post, a pin-and-clip at differing height holes, an adjustable bolt, or the like.

Figure 10:
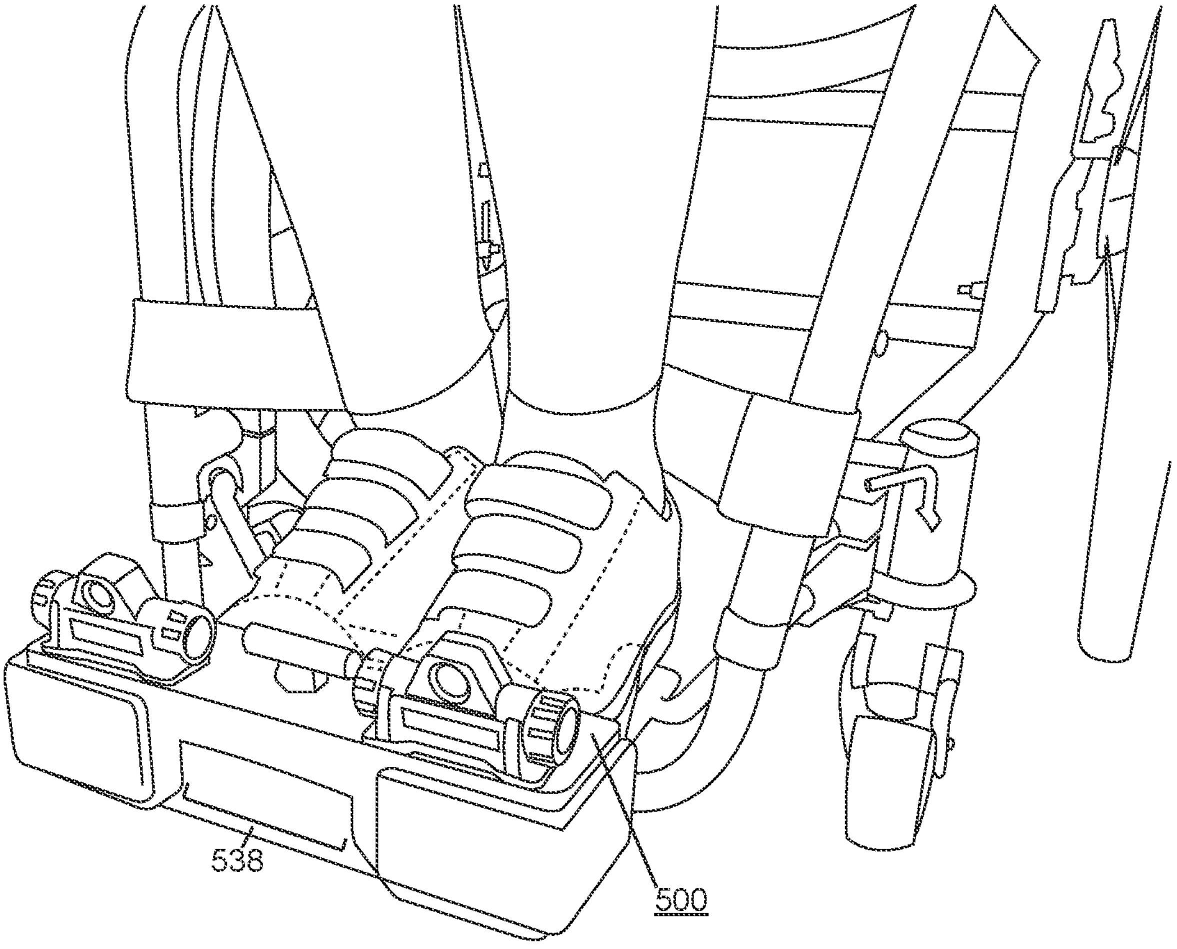
FIG. 10 represents a perspective view of the adaptable attachment foot plate having a light attachment functional attachment.

FIG. 10 represents a perspective view of the adaptable attachment foot plate having a light attachment functional attachment. The light attachment functional portion 520 is attached to the top 516 of the functional attachment 500. The mounting slide 518 of the light attachment functional attachment 500 further includes a cut out portion 538 formed from the mounting slide 518 that accommodates attachment with another functional attachment 500. For example, in FIG. 6, the terrain wheel functional attachment and the light attachment functional attachment are attached to the adaptable attachment foot plate 100, where the cutout portion 538 accommodates the functional portion 520 of the terrain wheel functional attachment that extends from the mounting slide 518 of the terrain wheel functional attachment 500. In this arrangement the light attachment functional attachment 500 resides on top of the terrain wheel functional attachment and on the outside of the grooved slots 118.

The invention claimed is:

1. An adaptable attachment foot plate for removable attachment to a wheelchair, the adaptable attachment foot plate comprising:

- a base, where the base is removably attached to a rigid frame of the wheelchair, the base comprising
  - a plate,
  - two bracket attachments, where each bracket attachment extends outward and upward from the plate, wherein
    - the bracket attachments are removably attached to the rigid frame of the wheelchair; and
  - screw hole attachment points, the screw hole attachment points residing in the plate, wherein
    - the screw hole attachment points provide removable attachment to the rigid frame of the wheelchair; and
- a guard, where the guard is attached to the plate opposite from the screw hole attachment points, the guard comprising
  - a toe guard, where the toe guard is a rectangular shape having a top, a bottom, a front, a left side, and a right side; wherein
    - a fastener opening is formed from the top of the toe guard, where the fastener opening receives a fastener;
  - a mounting bracket, the mounting bracket extending in front of the toe guard, where the mounting bracket forms two grooved slots configured to receive a functional attachment; and
  - the fastener removably attached to the fastener opening and configured to lock the functional attachment to the guard.

2. The foot plate of claim 1, wherein

- the guard is removably attached to the plate via a groove on the bottom side of the plate that receives the bottom side of the toe guard, where the guard is removably secured via one or more screws.

3. The foot plate of claim 1, wherein the fastener is a threaded screw.

4. The foot plate of claim 1, wherein

- the two grooved slots of the mounting bracket form an attachment opening from 5.08 to 21.59 centimeters in width.

5. The foot plate of claim 4, wherein

- each of the two grooved slots of the mounting bracket have a width from 5.08 to 12.065 centimeters.

6. The foot plate of claim 1, further comprising

- the functional attachment, where the functional attachment includes a functional portion, where the functional portion is selected from at least one of a group consisting of a terrain wheel, a light attachment, a wood table, a gun stand, and a fishing rod holder.

7. The foot plate of claim 1, wherein the toe guard has a height from 3.81 to 12.7 centimeters.

8. The foot plate of claim 1, wherein the grooved slots have a height from 2.41 to 12.7 centimeters.

* * * * *